(12) United States Patent
Borzych et al.

(10) Patent No.: US 7,835,963 B1
(45) Date of Patent: Nov. 16, 2010

(54) SYSTEMS AND METHODS FOR RETIREMENT ASSET DISTRIBUTION

(75) Inventors: Christopher L. Borzych, San Antonio, TX (US); John Gmelch, Brooklyn, NY (US); Veronica Gmelch, legal representative, Brooklyn, NY (US)

(73) Assignee: United Services Automobile Association (USAA), San Antonio, TX (US)

( * ) Notice: Subject to any disclaimer, the term of this patent is extended or adjusted under 35 U.S.C. 154(b) by 384 days.

(21) Appl. No.: 12/046,799

(22) Filed: Mar. 12, 2008

(51) Int. Cl.
*G06Q 40/00* (2006.01)
(52) U.S. Cl. ...................... 705/35; 705/36 R
(58) Field of Classification Search .......... 705/35–36 R
See application file for complete search history.

(56) References Cited

U.S. PATENT DOCUMENTS

| | | |
|---|---|---|
| 2005/0137953 A1 | 6/2005 | McDonough et al. |
| 2005/0177509 A1 | 8/2005 | Mahaney et al. |
| 2007/0061238 A1 | 3/2007 | Merton et al. |
| 2007/0156559 A1 | 7/2007 | Wolzenski et al. |

OTHER PUBLICATIONS

Ameriks, J. "Making retirement income last a lifetime." Journal of Financial Planning. Dec. 2001. Retrieved from the internet <http:www.tiaa-crefinstitute.org/research/articles/docs/120101.pdf>.

Chen et al. "Merging Asset Allocation and Longevity Insurance: An Optimal Perspectiveon Payout Annuities." Journal of Financial Planning. Feb. 20, 2003. Retrieved from the internet <http://www.soa.org/library/monographs/retirement-systems/managing-retirement-assests-symposium/2004/march/m-rs04-2-10.pdf>.

*Primary Examiner*—Thu Thao Havan
(74) *Attorney, Agent, or Firm*—Chadbourne & Parke, LLP; Walter G. Hanchuk

(57) ABSTRACT

The present disclosure describes systems and methods for distributing retirement assets. One or more embodiments include receiving personal data related to an individual, the personal data including a number of projected income sources and a value of projected expenses of the individual, and receiving retirement asset allocation data of the individual, the retirement asset allocation data including current fund allotments to a number of money classes each having disparate tax treatment. One or more embodiments include calculating a value of projected after-tax income of the individual, calculating a deficit amount when the value of projected expenses exceeds the value of projected after-tax income, and using orthogonal sampling to calculate a distribution schedule for funding the deficit amount, the distribution schedule including, for each of the number of money classes, a recommended sum for the individual to withdraw from the money class in order to fund the deficit amount.

21 Claims, 10 Drawing Sheets

Fig. 3A

| FIG. 3A-1 |
| FIG. 3A-2 |

302 — Personal data

304 {
| date of birth | 9/15/1942 |
| age | 65 |
| marital status | married |
| spouse's dob | 3/15/1941 |
| spouse's age | 67 |

312 — Current monthly income data

314 {
| earnings | 800 | inflation-adj'd | yes |
| pension | 750 | inflation-adj'd | no |
| annuity | | inflation-adj'd | no |
| other income | | inflation-adj'd | no |
| social security | 2,200 | current | |
| total | 3,750 | | |

306 — Tax data

308 {
| filing status | married filing jointly |
| blindness | 0 |
| fed dependents | 0 |
| deduction type | standard |

| | start | 1/30/2008 | end at age | 70 |
| | start | 1/30/2008 | end at age | |
| | start | | end at age | |
| | start | | end at age | |

316 — Portfolio parameters

318 — horizon  20
322 — income target  6,000    inflation-adj'd   yes    324 — inflation assumption   2.70%

Fig. 3A-1

| Portfolio data | 328-1 | 328-2 | 328-3 | 329 |
| --- | --- | --- | --- | --- |
| Asset sector | Roth | Other Qualified | Non-Qualified | All |
| Fixed Deferred Annuity | 0 | 0 | 0 | 0 |
| Money Market & Deposits | 0 | 0 | 25,000 | 25,000 |
| Short Bond | 5,000 | 5,000 | 0 | 10,000 |
| Intermediate Bond | 7,000 | 22,000 | 0 | 29,000 |
| Long Bond | 5,000 | 25,000 | 0 | 30,000 |
| Short Muni Bond | 0 | 0 | 0 | 0 |
| Int Muni Bond | 0 | 0 | 5,000 | 5,000 |
| Long Muni Bond | 0 | 0 | 0 | 0 |
| High Yield | 12,000 | 40,000 | 0 | 52,000 |
| Large Cap Growth | 10,000 | 45,000 | 0 | 55,000 |
| Large Cap Value | 15,000 | 25,000 | 0 | 40,000 |
| Large Cap Core | 0 | 0 | 29,000 | 29,000 |
| Small Cap Growth | 0 | 0 | 22,000 | 22,000 |
| Small Cap Value | 4,000 | 7,000 | 0 | 11,000 |
| Small Cap Blend | 3,000 | 10,000 | 0 | 13,000 |
| International Equity | 5,000 | 20,000 | 25,000 | 50,000 |
| Emerging Markets | 10,000 | 15,000 | 0 | 25,000 |
| Real Estate | 0 | 3,000 | 0 | 3,000 |
| Precious Metals | 0 | 0 | 17,000 | 17,000 |
| Other equity sector | 0 | 12,000 | 0 | 12,000 |
| total | 76,000 | 229,000 | 123,000 | 428,000 |

326

| Model output | 2008 | 2009 |
| --- | --- | --- |
| earnings | 800 | 822 |
| pension | 750 | 750 |
| social security | 2,200 | 2,259 |
| RMD | 0 | 0 |
| additional qual | 0 | 0 |
| Roth | 0 | 0 |
| nonqualified | 896 | 945 |
| nontaxable | 15 | 0 |
| other income | 0 | 0 |
| pre-tax income | 4,661 | 4,776 |
| federal tax | 1,730 | 1,782 |
| state tax | 0 | 0 |
| monthly after-tax income | 4,517 | 4,628 |
| surplus (shortfall) | (1,483) | (1,534) |
| terminal portfolio value | 729,210 | in January 2028 |

| | | | | | | | | |
|---|---|---|---|---|---|---|---|---|
| 322 — Cash Flow Target | 6,000 | 6,162 | 6,328 | 6,499 | 6,675 | 6,855 | 7,040 | ⋯ 10,223 |
| 336 — After-tax cash flow | 4,517 | 4,628 | 3,861 | 3,947 | 4,035 | 4,384 | 4,501 | ⋯ 6,709 |
| 338 — Surplus (shortfall) | (1,483) | (1,534) | (2,468) | (2,552) | (2,640) | (2,471) | (2,539) | (3,514) |
| Cash Flow Sources | 2008 | 2009 | 2010 | 2011 | 2012 | 2013 | 2014 | ⋯ 2028 |
| earnings | 800 | 822 | 844 | 867 | 890 | 0 | 0 | 0 |
| pension | 750 | 750 | 750 | 750 | 750 | 750 | 750 | 750 |
| annuity | 0 | 0 | 0 | 0 | 0 | 0 | 0 | 0 |
| other income | 0 | 0 | 0 | 0 | 0 | 0 | 0 | 0 |
| social security | 2,200 | 2,259 | 2,320 | 2,383 | 2,447 | 2,513 | 2,581 | 3,748 |
| taxable soc sec | 0 | 0 | 0 | 0 | 0 | 0 | 0 | 105 |
| 332 — RMD | 0 | 0 | 0 | 0 | 0 | 1,124 | 1,172 | 2,128 |
| addtional qual | | | | | | | | |
| Roth | | | | | | | | |
| nonqualified | 896 | 945 | | | | | | |
| muni | 15 | 0 | 0 | 0 | 0 | 0 | 0 | 0 |
| other income | | | | | | | | |
| Pre-tax income | 4,661 | 4,776 | 3,914 | 4,000 | 4,087 | 4,387 | 4,503 | 6,731 |
| taxable income | 2,446 | 2,517 | 1,594 | 1,617 | 1,640 | 1,874 | 1,922 | 2,983 |
| After-tax income | 4,517 | 4,628 | 3,861 | 3,947 | 4,035 | 4,384 | 4,501 | 6,709 |
| 344 — Taxes | | | | | | | | |
| fed exemption | 6,600 | 6,778 | 6,961 | 7,149 | 7,342 | 7,540 | 7,744 | 11,245 |
| fed deductions | 12,800 | 13,146 | 13,501 | 13,865 | 14,239 | 14,624 | 15,019 | 21,808 |
| taxable soc sec | | | | | | | | |
| state ded/exempt | | | | | | | | |
| fed taxable | 9,952 | 10,275 | (1,336) | (1,615) | (1,902) | 319 | 300 | 2,745 |
| federal tax | 995 | 1,028 | (134) | (162) | (190) | 32 | 30 | 274 |
| fica | 734 | 754 | 775 | 796 | 817 | 0 | 0 | 0 |
| ss clawback rate | 0.33 | 0.00 | 0.00 | 0.00 | 0.00 | 0.00 | 0.00 | 0.00 |
| ss clawback threshold | | | | | | | | |
| state tax | 0 | | | | | | | |

PROJECTED MONTHLY CASH
FLOW DEFICIT FOR THIS YEAR
($1,483)

477

DISTRIBUTION SCHEDULE

- BASED ON YOUR $1,483 MONTHLY CASH FLOW DEFICIT, THE FOLLOWING MONTHLY DISTRIBUTION SCHEDULE WOULD BE APPROPRIATE FOR THIS TAX YEAR TO MAXIMIZE YOUR LONG-TERM WEALTH:

| PERCENT | MONEY CLASS | PARTICULAR ACCOUNT | AMOUNT |
|---------|-------------|---------------------|--------|
| 5% | CASH : | C2 (SAVINGS) | $74.00 | 458-1
| 12% | QUALIFIED : | Q1 (SELF-DIRECTED IRA) | $178.00 | 458-2
| 0% | ROTH : | R1 (ROTH IRA) | $0.00 | 458-3
| 49% | NON-QUALIFIED : | NQ2 (BROKERAGE) | $727.00 | 458-4
| 8% | NON-QUALIFIED DEFERRED ANNUITIES : | DA1 (PERSONAL PENSION ANNUITY) | $118.00 | 458-5
| 26% | MUNICIPAL BONDS : | MB1 (BOND FUND INCOME) | $386.00 | 458-6
| | | TOTAL | $1,483.00 |

| FIG. 5A | FIG. 5B |
|---------|---------|

500 →

| | | | 580 Qualified Return Rate | 582 Interest | 584 Dividends | 586 Cap Gains | 588 Turnover | 590 Realized Gains |
|---|---|---|---|---|---|---|---|---|
| 571 → Qualified Balance | $115,000 | | | | | | | |
| 573 → Non-Qual Balance | $245,000 | | | | | | | |
| 574 → Number of Years | 20 | | | | | | | |
| 575 → Income Tax Rate | 35.00% | | | | | | | |
| 576 → Cap Gains Tax Rate | 15.00% | | | | | | | |
| Asset Classes | Balance | Avg Balances | | | | | | |
| Cash | $25,000 | 20,000 | 4.00% | 4.00% | 0.00% | 0.00% | 0% | 0.00% |
| Short Bond | $5,000 | 20,000 | 5.00% | 5.00% | 0.00% | 0.00% | 0% | 0.00% |
| Intermediate Bond | $22,000 | 20,000 | 5.40% | 5.40% | 0.00% | 0.00% | 0% | 0.00% |
| Long Bond | $25,000 | 20,000 | 5.40% | 5.40% | 0.00% | 0.00% | 0% | 0.00% |
| Short Muni Bond | $0 | 20,000 | 3.50% | 3.50% | 0.00% | 0.00% | 0% | 0.00% |
| Int Muni Bond | $5,000 | 20,000 | 3.78% | 3.78% | 0.00% | 0.00% | 0% | 0.00% |
| Long Muni Bond | $0 | 20,000 | 3.78% | 3.78% | 0.00% | 0.00% | 0% | 0.00% |
| High Yield | $40,000 | 20,000 | 6.60% | 6.60% | 0.00% | 0.00% | 0% | 0.00% |
| Large Cap Growth | $45,000 | 20,000 | 8.10% | 0.00% | 1.20% | 6.90% | 70% | 4.83% |
| Large Cap Value | $25,000 | 20,000 | 8.10% | 0.00% | 2.50% | 5.60% | 50% | 2.80% |
| Large Cap Core | $29,000 | 20,000 | 8.10% | 0.00% | 1.80% | 6.30% | 60% | 3.78% |
| Small Cap Growth | $22,000 | 20,000 | 9.07% | 0.00% | 1.00% | 8.07% | 10% | 0.81% |
| Small Cap Value | $7,000 | 20,000 | 9.07% | 0.00% | 1.30% | 7.77% | 55% | 4.27% |
| Small Cap Blend | $10,000 | 20,000 | 9.07% | 0.00% | 1.10% | 7.97% | 65% | 5.18% |
| International | $45,000 | 20,000 | 8.50% | 0.00% | 2.00% | 6.50% | 60% | 3.90% |
| Emerging Markets | $35,000 | 20,000 | 9.90% | 0.00% | 2.00% | 7.90% | 60% | 4.74% |
| Real Estate | $3,000 | 20,000 | 7.50% | 0.00% | 1.00% | 6.50% | 60% | 3.90% |
| Precious Metals | $17,000 | 20,000 | 4.50% | 0.00% | 1.25% | 3.25% | 40% | 1.30% |
| Balance | $360,000 | $360,000 | | | | | | |

| 592 Deferred Growth | 594 Non Qual Return Rate | 596 Qualified FV | 597 Non Qual FV | 598 Rank Value | 599 Rank | 572 Sorted Asset Classes |
|---|---|---|---|---|---|---|
| 0.00% | 4.00% | $28,485 | $33,418 | -$34,227 | 15 | 1 High Yield |
| 0.00% | 5.00% | $34,493 | $37,916 | -$3,424 | 4 | 2 Intermediate Bond |
| 0.00% | 5.40% | $37,218 | $39,873 | -$2,655 | 2 | 3 Long Bond |
| 0.00% | 5.40% | $37,218 | $39,873 | -$2,655 | 3 | 4 Short Bond |
| 0.00% | 3.50% | $25,867 | $31,363 | -$34,227 | 16 | 5 Precious Metals |
| 0.00% | 3.78% | $27,303 | $32,498 | -$34,227 | 17 | 6 Large Cap Growth |
| 0.00% | 3.78% | $27,303 | $32,498 | -$34,227 | 18 | 7 Real Estate |
| 0.00% | 6.60% | $46,675 | $46,332 | $343 | 1 | 8 Large Cap Core |
| 2.07% | 8.10% | $61,724 | $80,271 | -$18,547 | 6 | 9 Large Cap Value |
| 2.80% | 8.10% | $61,724 | $81,927 | -$20,203 | 9 | 10 International |
| 2.52% | 8.10% | $61,724 | $81,288 | -$19,564 | 8 | 11 Small Cap Blend |
| 7.26% | 9.07% | $73,799 | $108,025 | -$34,226 | 14 | 12 Small Cap Value |
| 3.50% | 9.07% | $73,799 | $97,342 | -$23,544 | 12 | 13 Emerging Markets |
| 2.79% | 9.07% | $73,799 | $95,453 | -$21,654 | 11 | 14 Small Cap Growth |
| 2.60% | 8.50% | $66,457 | $86,793 | -$20,337 | 10 | 15 Cash |
| 3.16% | 9.90% | $85,881 | $109,827 | -$23,946 | 13 | 16 Short Muni Bond |
| 2.60% | 7.50% | $55,222 | $74,064 | -$18,842 | 7 | 17 Int Muni Bond |
| 1.95% | 4.50% | $31,352 | $44,823 | -$13,471 | 5 | 18 Long Muni Bond |

SYSTEMS AND METHODS FOR RETIREMENT ASSET DISTRIBUTION

CROSS REFERENCE TO RELATED APPLICATIONS

This application is related by subject matter to: U.S. patent application Ser. No. 12/046,852 filed Mar. 12, 2008, entitled "Systems and Methods for Retirement Asset Distribution,"; and U.S. patent application Ser. No. 12/046,916 filed Mar. 12, 2008, entitled "Systems and Methods for Retirement Asset Distribution,". The entire contents of the aforementioned applications are herein expressly incorporated by reference.

BACKGROUND

Many working individuals have retirement plans in place to support themselves financially when they retire from the workforce. Such plans generally manage and/or invest the employee's assets in order to provide financial security when the employee retires and no longer receives a regular income.

Upon retirement, an individual often still receives at least some income from a variety of sources. For example, many retirees receive income from social security benefits, pensions, and/or annuities. Other income can include investment income, required minimum distributions (RMDs), and/or wages from a part-time job, for instance.

In addition to income sources, a retired individual often has a number of retirement assets accumulated as part of a retirement plan or otherwise. Retirement assets can include various types of individual retirement accounts (IRAs), 401(k) plans, savings accounts, and brokerage accounts, among many others.

The long-term value of a retired individual's retirement asset portfolio can be affected by factors including the manner in which funds are allocated, e.g., which asset classes are used to fund retirement accounts, and the manner in which funds are distributed from the individual's retirement accounts in order to provide for a retired individual's cash flow target during retirement. Tax implications associated with the various retirement assets can also affect an individual's long-term portfolio value.

SUMMARY

The present disclosure provides methods and systems for distributing retirement assets. In various embodiments, a retirement asset distribution tool incorporates a number of factors including income taxes, social security, capital gains, exemptions, and deductions, among other factors in order to provide a distribution schedule for funding a retired individual's cash flow target.

One or more embodiments of the present disclosure provide a system for distributing retirement assets that includes a subsystem configured to: receive personal data related to an individual, the personal data including a number of projected income sources and a value of projected expenses of the individual; and receive retirement asset allocation data of the individual, the retirement asset allocation data including current fund allotments to a number of money classes each having disparate tax treatment. The system includes a computing device configured to: calculate a value of projected after-tax income of the individual; calculate a deficit amount when the value of projected expenses exceeds the value of projected after-tax income; and use orthogonal sampling to calculate a distribution schedule for funding the deficit amount, the distribution schedule including, for each of the number of money classes, a recommended sum for the individual to withdraw from the money class in order to fund the deficit amount.

The disclosure also provides a method for distributing retirement assets that includes: receiving personal data related to an individual, the personal data including a number of projected income sources and a value of projected expenses of the individual; receiving retirement asset allocation data of the individual, the retirement asset allocation data including current fund allotments to a number of money classes each having disparate tax treatment; calculating a value of projected after-tax income of the individual; calculating a deficit amount when the value of projected expenses exceeds the value of projected after-tax income; and using orthogonal sampling to calculate a distribution schedule for funding the deficit amount, the distribution schedule including, for each of the number of money classes, a recommended sum for the individual to withdraw from the money class in order to fund the deficit amount.

The disclosure further provides a computer readable medium having instructions stored thereon that can be executed by a computing device to: receive personal data related to an individual, the personal data including a number of projected income sources and a value of projected expenses of the individual; receive retirement asset allocation data of the individual, the retirement asset allocation data including current fund allotments to a number of money classes each having disparate tax treatment; calculate a value of projected after-tax income of the individual; calculate a deficit amount when the value of projected expenses exceeds the value of projected after-tax income; and use orthogonal sampling to calculate a distribution schedule for funding the deficit amount, the distribution schedule including, for each of the number of money classes, a recommended sum for the individual to withdraw from the money class in order to fund the deficit amount.

One or more embodiments of the present disclosure provides a system for distributing retirement assets that includes a subsystem configured to: receive personal data related to an individual, the personal data including a target income value of the individual and a number of income sources of the individual for a first year; and receive current retirement asset data of the individual. The retirement asset data includes: current fund allotments to a number of money classes, each of the number of money classes having a disparate tax treatment and including one or more investment instruments; and, for at least some of the number of money classes, current fund allotments to a number of asset classes used to fund the one or more investment instruments. The system includes a computing device configured to: calculate a first year deficit amount when the target income value exceeds a projected after-tax income value of the individual for the first year; and calculate a distribution schedule for funding the first year deficit amount, the distribution schedule including particular sums to withdraw from each of the number of money classes in the first year in order to maximize a projected total retirement portfolio value of the number money classes over a particular time horizon as determined, at least in part, by orthogonal sampling over the particular time horizon.

The disclosure also provides a method for distributing retirement assets that includes: receiving personal data related to an individual, the personal data including a target income value of the individual and a number of income sources of the individual for a first year; and receiving current retirement asset data of the individual. The retirement asset data includes: current fund allotments to a number of money classes, each of the number of money classes having a disparate tax treatment and including one or more investment instruments; and, for at least some of the number of money classes, current fund allotments to a number of asset classes used to fund the one or more investment instruments. The method includes calculating a first year deficit amount when the target income value exceeds a projected after-tax income value of the individual for the first year; and calculating a distribution schedule for funding the first year deficit amount, the distribution schedule including particular sums to withdraw from each of the number of money classes in the first year in order to maximize a projected total retirement portfolio value of the number money classes over a particular time horizon as determined, at least in part, by orthogonal sampling over the particular time horizon.

The disclosure further provides a computer readable medium having instructions stored thereon that can be executed by a computing device to: receive personal data related to an individual, the personal data including a target income value of the individual and a number of income sources of the individual for a first year; and receive current retirement asset data of the individual. The retirement asset data includes: current fund allotments to a number of money classes, each of the number of money classes having a disparate tax treatment and including one or more investment instruments; and, for at least some of the number of money classes, current fund allotments to a number of asset classes used to fund the one or more investment instruments. The medium includes instructions executed to: calculate a first year deficit amount when the target income value exceeds a projected after-tax income value of the individual for the first year; and calculate a distribution schedule for funding the first year deficit amount, the distribution schedule including particular sums to withdraw from each of the number of money classes in the first year in order to maximize a projected total retirement portfolio value of the number money classes over a particular time horizon as determined, at least in part, by orthogonal sampling over the particular time horizon.

One or more embodiments of the present disclosure provide a system for distributing retirement assets that includes: a subsystem configured to determine a number of income values of an individual for a retirement year, determine a number of retirement money sources available to the individual for the retirement year, and divide the number of retirement money sources available to the individual into a number of particular money classes each having disparate tax treatment; and a distribution tool configured to use orthogonal sampling to calculate a distribution schedule for funding an after-tax cash flow target value of the individual for the retirement year. The distribution schedule includes, for each of the number of particular money classes, a particular sum for the individual to withdraw in order to fund the after-tax cash flow target value.

The present disclosure also provides a method for distributing retirement assets that includes: determining a number of income values of an individual for a retirement year, determining a number of retirement money sources available to the individual for the retirement year, and dividing the number of retirement money sources available to the individual into a number of particular money classes each having disparate tax treatment; and using orthogonal sampling to calculate a distribution schedule for funding an after-tax cash flow target value of the individual for the retirement year. The distribution schedule includes, for each of the number of particular money classes, a particular sum for the individual to withdraw in order to fund the after-tax cash flow target value.

The disclosure further provides a computer readable medium having instructions stored thereon that can be executed by a computing device to: determine a number of income values of an individual for a retirement year, determine a number of retirement money sources available to the individual for the retirement year, and divide the number of retirement money sources available to the individual into a number of particular money classes each having disparate tax treatment; and use orthogonal sampling to calculate a distribution schedule for funding an after-tax cash flow target value of the individual for the retirement year. The distribution schedule includes, for each of the number of particular money classes, a particular sum for the individual to withdraw in order to fund the after-tax cash flow target value.

BRIEF DESCRIPTION OF THE DRAWINGS

FIG. 3A illustrates a subsystem for receiving input data and parameters associated with distributing retirement assets in accordance with one or more embodiments of the present disclosure.

FIG. 3B illustrates a subsystem for determining projected data based on data and input parameters received by the subsystem illustrated in FIG. 3A.

FIG. 4B illustrates a distribution schedule in accordance with an embodiment of the present disclosure.

FIG. 5 illustrates an asset allocation tool that can be used for distributing retirement assets in accordance with embodiments of the present disclosure.

DETAILED DESCRIPTION

The present disclosure describes systems and methods for distributing retirement assets. In various embodiments, a retirement asset distribution tool incorporates a number of factors including income taxes, social security, capital gains, exemptions, and deductions, among other factors in order to provide a distribution schedule for funding a retired individual's cash flow target.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

Figure 1:
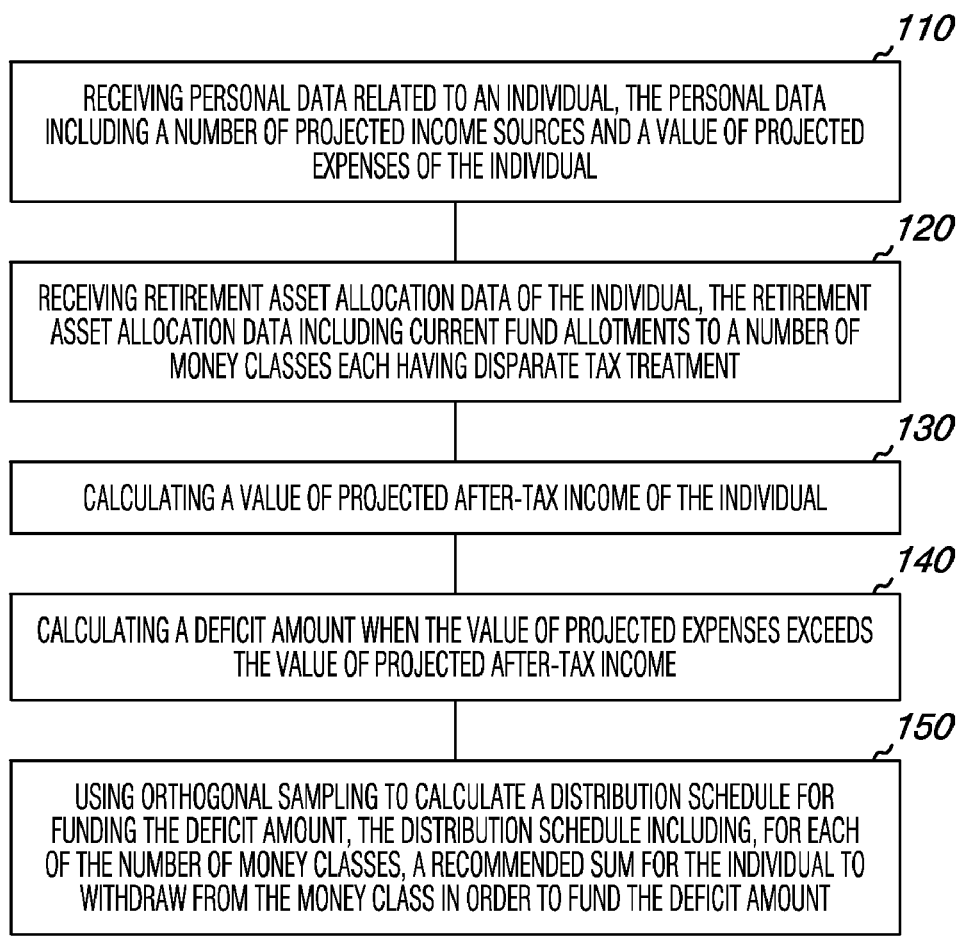
FIG. 1 illustrates a method for distributing retirement assets according to an embodiment of the present disclosure.

FIG. 1 illustrates a method for distributing retirement assets according to an embodiment of the present disclosure. At block 110, the method illustrated in FIG. 1 includes receiving personal data related to an individual. The personal data can include a number of projected income sources and a value of projected expenses of the individual.

As an example, projected income sources can include expected earnings such as wages, social security benefits, pensions, annuities, investment income, income from rents, and/or royalties, among various other expected or projected taxable and non-taxable income sources of an individual for a given retirement year. Income sources may also include required minimum distributions (RMDs). RMDs can refer to amounts that the federal government may require an individual to withdraw annually from traditional individual retirement accounts (IRAs) and employer-sponsored retirement plans, e.g., 401(k) plans, after age 70½. In one or more embodiments of the present disclosure, received personal data can include various tax data such as date of birth, age, marital status, spousal date of birth and/or age, filing status (e.g., single, married, married filing jointly, married filing separately), number of dependents, and blindness status, among various other tax data.

In various embodiments, the projected expenses of an individual can be a cash flow target of an individual. For instance, a cash flow target can be a monthly or yearly amount that an individual desires and/or requires to meet a particular standard of living during retirement. In various embodiments, a cash flow target can be an after-tax cash flow target, e.g., a monthly or yearly target amount incorporating federal and/or state income tax burden.

At block 120, the method illustrated in FIG. 1 includes receiving retirement asset allocation data of the individual. In various embodiments, the retirement asset allocation data can include current fund allotments to a number of money classes each having disparate tax treatment. As used herein, a money class can refer to a particular grouping of one or more money sources based, at least in part, on the tax treatment of the money source. As used herein, a money source refers to an account or investment instrument holding funds available to an individual, e.g., a savings account, a checking account, a Roth IRA, a brokerage account, a fixed non-qualified deferred annuity, a money market account, a Simple IRA, a Self-Directed IRA, a municipal bond, and/or a 401(k) plan, among various other accounts or investment instruments. As one of ordinary skill in the art will appreciate, various money sources such as IRAs and 401(k) plans can be funded with assets from various asset classes including various types of stocks and/or bonds, real estate, emerging markets, and/or precious metals, to name a few.

In one or more embodiments, and as illustrated in FIG. 3A, the received asset allocation data can include current fund allotments to the number of different asset classes used to fund a particular money source and/or money class. For instance, the received allocation data can include current fund allotments to particular bond types and other asset classes within a 401(k) plan, which may be a part of a "qualified" money class or may be categorized as its own money class.

In various embodiments, one example of a money class can be a grouping of tax-deferred, e.g., qualified, plans such as traditional IRA plans, 401(k) plans, and Thrift Savings Plans (TSPs). A money class can also include a single money source. For instance, one example of a money class can be a Roth IRA. The Roth IRA can be considered a money class separate from the one above due to the fact that contributions to a Roth IRA are made with after-tax dollars (versus pre-tax for other IRAs) and withdrawals may be made from a Roth IRA without penalties. As another example, cash can be a money class and may consist of accounts similarly treated for tax purposes, e.g., savings accounts, checking accounts, and/or money market accounts not within a qualified plan such as an IRA or 401(k) plan. A further example of a money class is a grouping of particular non-qualified accounts such as mutual fund and brokerage accounts, e.g., mutual funds and brokerage accounts outside qualified plans.

One or more embodiments of the present disclosure includes dividing the number of retirement money sources available to the individual into a number of particular money classes. However, embodiments of the present disclosure are not limited to particular money classes, e.g., to particular groupings of money sources.

At block 130, the method illustrated in FIG. 1 includes calculating a value of projected after-tax income of the individual. As described further in connection with FIGS. 3A and 3B, the calculated projected after-tax income can be based on projected federal and state income tax information including deductions, exemptions, and social security clawback rates, among various other tax information and/or personal data related to an individual retiree.

At block 140, the method includes calculating a deficit amount when the value of projected expenses exceeds the value of projected after-tax income. In one or more embodiments, the deficit amount can refer to the amount of money for a retired individual to withdraw from the individual's various retirement assets, e.g., IRAs, savings accounts, Roth accounts, and/or non-qualified brokerage accounts, in order to meet the individual's after-tax cash flow target value.

As described further below, in various embodiments, one or more statistical sampling methods can be employed by a distribution tool in order to calculate a distribution schedule for funding the determined deficit amount. For instance, at block 150, the method illustrated in FIG. 1 includes using orthogonal sampling to calculate a distribution schedule for funding the deficit amount. However, embodiments of the present disclosure are not limited to a particular statistical sampling method used to calculate the distribution schedule.

For instance, in some embodiments a Monte Carlo sampling method can be used to calculate a distribution schedule. Orthogonal sampling can be more efficient than Monte Carlo sampling or other sampling methods that may employ repeated random sampling to reach a computation result. For instance, orthogonal sampling can provide that an ensemble of random numbers more accurately represents the real variability, as compared to other sampling methods. Other statistical sampling methods that can be employed in one or more embodiments of the present disclosure include Latin Hypercube sampling, Poisson Sampling, and/or Cluster Sampling, among other sampling techniques.

In one or more embodiments, the distribution schedule includes, for each of the number of money classes, a recommended sum for the individual to withdraw from the money class in order to fund the deficit amount, e.g., in order to reach an after-tax cash flow target value. In various embodiments, computer executable instructions can be executed to provide a calculated distribution schedule that includes particular sums for an individual to withdraw from each of the number of money classes in a particular retirement year, e.g., a current retirement year, while maximizing a projected after-tax end of time value of the number of money classes over a particular time horizon. An example of a distribution schedule in accordance with embodiments of the present disclosure is shown in FIG. 4B.

In various embodiments, computer executable instructions can be executed to automatically withdraw the recommended particular sums from an account associated with the money class on the individual's behalf, based on the distribution schedule. As an example, the funds can be automatically withdrawn and automatically provided to pay various bills of the retired individual, e.g., on a scheduled basis such as monthly, for instance.

In various embodiments, the distribution schedule for funding the retired individual's cash flow target amount for a current year is independent of whether a projected total retirement portfolio value is sufficient to fund a projected cash flow target amount for one or more subsequent retirement years. That is, in various embodiments, a distribution schedule for a current year, which maximizes an end of time value of an individual's retirement asset portfolio, does not depend on the particular end of time value of the portfolio.

Various embodiments of the present disclosure provide improved systems and methods for retirement asset distribution as compared to previous approaches. For instance, for a given value of an individual's current retirement asset portfolio, embodiments of the present disclosure can provide a distribution schedule that indicates from which particular money sources the individual's after-tax cash flow target is to be derived in order to produce the highest future value of the retirement asset portfolio after a particular time period. Various embodiments can employ statistical sampling methods such as orthogonal sampling to project future growth on the current fund allotments to the number of different asset classes in order to calculate the distribution schedule.

Figure 2:
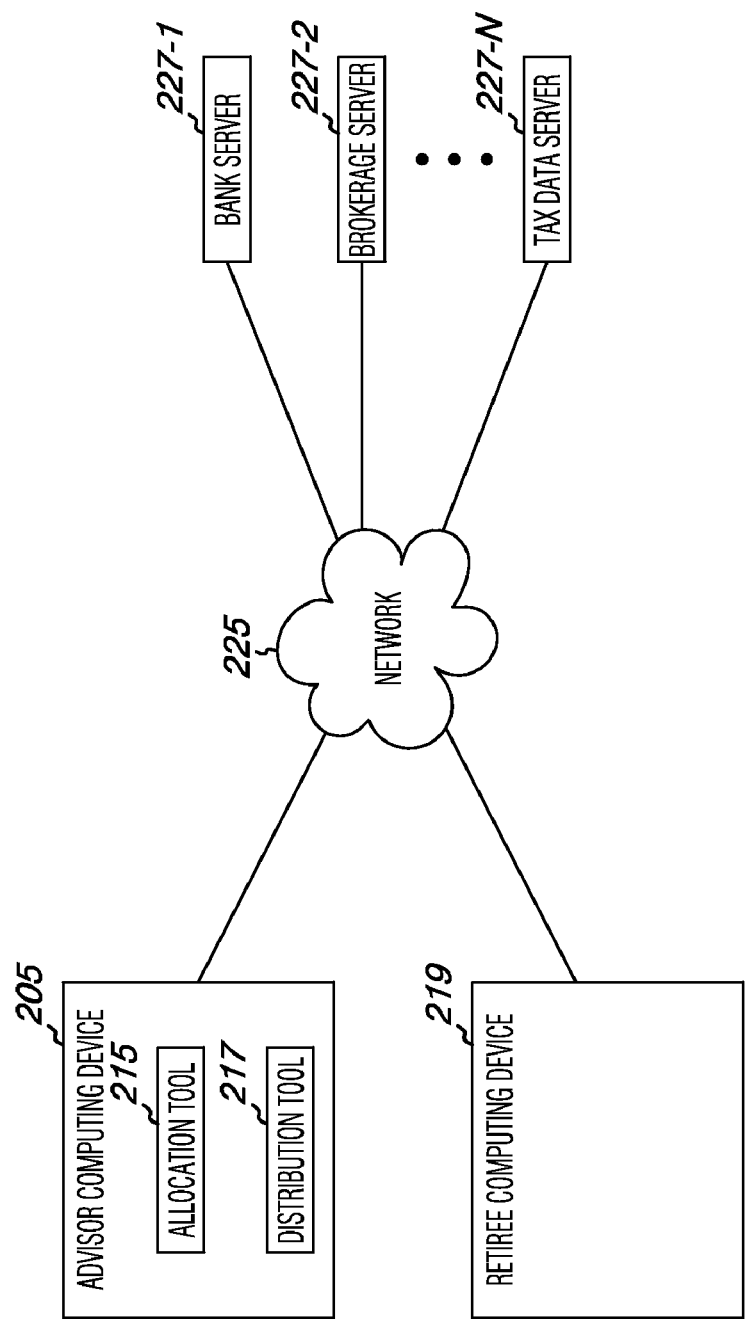
FIG. 2 illustrates a system for distributing retirement assets according to an embodiment of the present disclosure.

FIG. 2 illustrates a system for distributing retirement assets according to an embodiment of the present disclosure. As an example, one or more of the embodiments described in connection with FIG. 1 can be implemented using the system illustrated in FIG. 2.

In the embodiment illustrated in FIG. 2, the system includes a computing device 205, a computing device 219, and a number of computing devices 227-1, 227-2, . . . , 227-N that can communicate via one or more protocols over a network 225. The designator "N" is used herein to indicate that a system can include a number of servers. Network 225 can be a wide area network (WAN) such as the Internet, for instance.

In the embodiment illustrated in FIG. 2, the computing device 205 is an advisor computing device 205 and the computing device 219 is a retiree computing device 219. The computing devices 205 and 219 can be computers such as desktops or laptops as well as various handheld computing devices such as a personal digital assistants (PDAs) or cellular telephones, among various other computing devices capable of communicating with other computing devices via the network 225.

In the embodiment illustrated in FIG. 2, the advisor computing device 205 includes an application tool 215 and a distribution tool 217. The tools 215 and 217 can be applications or programs, e.g., sets of computer executable instructions, storable on a memory and executable by a processor to perform methods for retirement asset distribution in accordance with embodiments described herein.

The system illustrated in FIG. 2 includes a bank server 227-1, a brokerage server 227-2, and a tax data server 227-N. The servers 227-1, 227-2, . . . , 227-N can include personal data, tax data, and/or retirement asset allocation data related to an individual, which can be provided to the tools 215 and/or 217 and used to calculate a distribution schedule in accordance with embodiments described herein. As an example, the bank server 227-1 can provide information associated with accounts the retired individual has with a particular bank, the brokerage server 227-2 can provide information associated with accounts the individual has with a particular brokerage, and the tax data server can provide information such as tax tables and tax rates, among various other tax information that can be used in one or more embodiments of the present disclosure.

FIG. 3A illustrates a subsystem 300 for receiving input data and parameters associated with distributing retirement assets in accordance with one or more embodiments of the present disclosure. FIG. 3B illustrates a subsystem 301 for determining projected data based on data and input parameters received by the subsystem illustrated in FIG. 3A. The subsystems 300 and 301 can be provided within a distribution tool in accordance with embodiments of the present disclosure, e.g., distribution tool 217 shown in FIG. 2 or distribution tool 475 described in connection with FIG. 4A.

The subsystem 300 illustrated in FIG. 3A can include a number of data fields to which data can be entered and/or imported. In various embodiments, the data fields can be selectably adjusted and instructions can be executed to automatically incorporate changes made to one or more of the data fields into various calculations. As an example, the subsystem 300 can be a display or graphical user interface (GUI) associated with a distribution tool.

As illustrated in the embodiment illustrated in FIG. 3A, the subsystem 300 is configured to receive personal data 302, tax data 306, current income data 312, a number of portfolio parameters 316, and retirement asset allocation data. The received data and parameters can be incorporated into a distribution tool in order to provide a distribution schedule for funding an after-tax cash flow target value in accordance with one or more embodiments of the present disclosure.

In the embodiment illustrated in FIG. 3A, the data fields 304, represent personal data 302 of a particular individual, e.g., an individual that is 65, married, and has a spouse who is 67. The data fields 308 represent tax data 306 related to the particular individual. In this embodiment, fields 314 represent current monthly incomes of the particular individual.

In the subsystem 300 illustrated in FIG. 3A, the portfolio parameters 316 include a time horizon 318 in years, e.g., 20 years in this example. The time horizon 318 can represent a particular time period used to calculate a maximized projected total retirement portfolio value using a sampling method such as orthogonal sampling.

In the embodiment illustrated in FIG. 3A, the income target 322 represents a monthly after-tax cash flow target value (in dollars), for the particular individual, e.g., $6,000/month in this example. As indicated in FIG. 3A, the income target 322 is selected to be inflation adjusted based on a projected inflation rate 324, e.g., 2.7% in this case.

In the subsystem 300 illustrated in FIG. 3A, the portfolio data section includes an indication of current fund allotments to a number of money classes 328-1 (Roth), 328-2 (Other Qualified), and 328-3 (Non-Qualified). As described above, the money classes 328-1, 328-2 and 328-3 can be divided based on the disparate tax treatment associated with the money class. As illustrated in the example shown in FIG. 3A, the Roth money class 328-1 includes a total fund allotment of $76,000, the Other Qualified money class 328-2 includes a total fund allotment of $229,000, and the Non-Qualified money class 328-3 includes a total fund allotment of $123,000.

As an example, the Roth money class 328-1 can include a grouping of money sources that includes a Roth IRA and a Roth 401(k). The Other Qualified money class 328-2 can include a grouping of a number of qualified money sources (other than Roth accounts), e.g., a Simple IRA, Self-Directed IRA, and/or 401(k), among other qualified money sources. The Non-Qualified money class 328-3 can include a grouping of non-qualified money sources, e.g., mutual funds and/or brokerage accounts, among other money sources not within a qualified plan.

In the embodiment illustrated in FIG. 3A, the subsystem 300 also includes current fund allotments to particular asset classes 326 used to fund one or more investment instruments or money sources within each of the money classes 328-1, 328-2, and 328-3. Column 329 indicates the sum of the fund allotments corresponding to each of the asset classes 326, as well as a total current value of the individual's retirement assets, e.g., $428,000 in this example.

The subsystem 300 also includes an output portion indicating a number of incomes 332 of the individual for the current year (2008) and a next subsequent year (2009). The incomes 332 include the individual's total taxable and non-taxable incomes including investment incomes and any RMDs. Data field 324 includes the individual's total pre-tax income. The subsystem includes the individual's monthly after-tax income 336 and calculates a surplus(shortfall) 338 based on whether the after-tax income 336 is greater(less) than the income target 322. That is, the subsystem 300 calculates a deficit amount 338 (as indicated by parentheses) when the target after-tax come value 322 exceeds the after-tax income 336 of the individual. In this example, the individual's monthly target cash flow target 322, e.g., $6,000, is $1,483 more than the after-tax income value 336, e.g., $4,517. That is, a deficit amount of $1,483 exists, which is to be funded using funds from one or more money classes associated with the individual's retirement asset portfolio.

An example of a distribution schedule calculated for funding the deficit amount 338, e.g., $1,483, is described below in connection with FIGS. 4A and 4B. The distribution schedule 475 illustrated in FIG. 4B indicates particular sums for the individual to withdraw from each of a number of money classes in order to maximize the future value of the individual's retirement portfolio, e.g., in order to provide a most efficient use of the individual's current total portfolio value ($428,000 as shown in column 329 of FIG. 3A).

FIG. 3B illustrates a subsystem 301 for determining projected data based on data and input parameters received by the subsystem illustrated in FIG. 3A. For example, in this embodiment, the subsystem 301 calculates projected values over a 20 year period in response horizon 318 indicates "20" as shown in FIG. 3A.

In the embodiment illustrated in FIG. 3B, the subsystem 301 calculates projected values for the cash flow target 322, after-tax cash flow 336, and surplus (shortfall) 338. In various embodiments, the subsystem 301 can calculate particular current and projected tax values 344 in response to data input to the subsystem 300. For instance, the tax values 344 can depend on the various personal data, tax data 306, and current monthly income data 312 provided to fields 304, 308, and 314, respectively. As one of ordinary skill in the art will appreciate, the particular data entered in fields 304, 308, and 314 can effect tax consequences for a particular individual retiree, e.g., tax rates, available deductions and/or exemptions, etc.

Figure 4A:
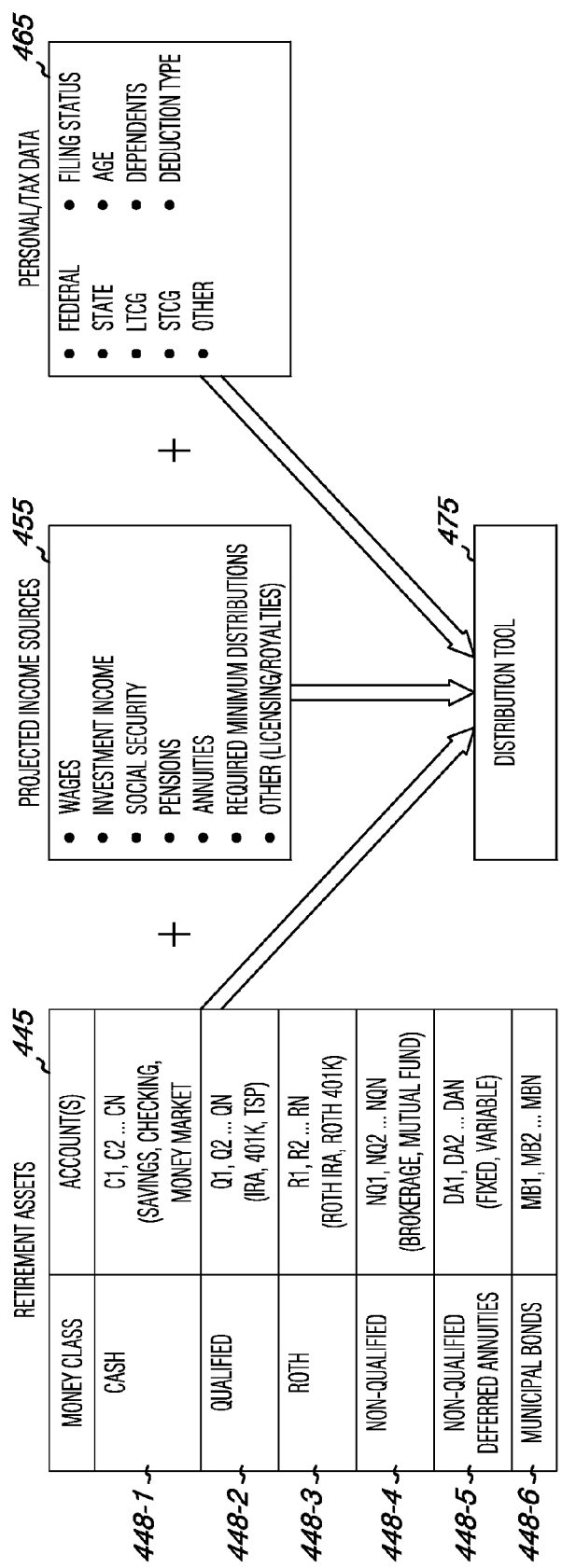
FIG. 4A is a diagram illustrating an example of data that can be provided to a retirement asset distribution tool in accordance with an embodiment of the present disclosure.

FIG. 4A is a diagram illustrating an example of data that can be provided to a retirement asset distribution tool 475 in accordance with an embodiment of the present disclosure. The embodiment illustrated in FIG. 4A includes retirement asset data 445, income source data 455 and personal and tax data 465 related to a retired or retiring individual.

In the embodiment illustrated in FIG. 4A, the retirement assets 445 include a number of money sources available to the individual for a current retirement year. As described above, the money sources can include various accounts and/or investment instruments, e.g., IRAs, Roth IRAs, money market accounts, savings accounts, various types of stocks and bonds, annuities, etc. In addition to money sources available to the individual via retirement assets 445, the individual also may have income sources 455 available, e.g., wages, investment income, social security, pensions, annuities, RMDs, etc.

As described above in connection with FIG. 1, in various embodiments, the number of money sources available the individual can be divided into a number of particular classes.

In various embodiments, the division of the money sources into the particular money classes is based on disparate tax treatment associated with the money sources.

In the embodiment illustrated in FIG. 4A, the money sources available to the individual are divided into six money classes 448-1 (Cash), 448-2 (Qualified), 448-3 (Roth), 448-4 (Non-Qualified), 448-5 (Non-Qualified Deferred Annuities), and 445-6 (Municipal Bonds). Each of the money classes 448-1, 448-2, 448-3, 448-4, 448-5, and 445-6 consists of a particular grouping of money sources, e.g., accounts, having a related tax treatment. For example, the Cash money class 448-1 includes money sources C1, C2, ..., CN. The Qualified money class 448-2 includes money sources Q1, Q2, ..., QN. The Roth money class 448-3 includes money sources R1, R2, ..., RN. The Non-Qualified money class 448-4 includes money sources NQ1, NQ2, ..., NQN. The Non-Qualified Deferred Annuity money class 448-5 includes money sources DA1, DA2, ..., DAN. The Municipal Bonds money class 448-6 includes money sources MB1, MB 2, ..., MBN.

In various embodiments, the data 445, 455, and 465 can be provided to the distribution tool 475 and a sampling method such as orthogonal sampling can be used to calculate a distribution schedule. The distribution schedule can provide, for each of the number of particular money classes, e.g., 448-1, 448-2, 448-3, 448-4, 448-5, and 445-6, a particular sum for the individual to withdraw in order to fund an after-tax cash flow target value, e.g., income target 322 shown in FIG. 3A.

In various embodiments, the calculated distribution schedule incorporates numerous factors including a variety of current and projected personal and/or tax data 465, current and projected income sources 455, as well as projected future growth associated with the particular asset classes used to fund accounts within the number of particular money classes over a particular number of future retirement years, e.g., time horizon 318 illustrated in FIG. 3A.

The projected future growth of particular asset classes is dependent upon several factors such as whether the particular asset class is within a qualified or non-qualified account. Therefore, the total end of time value of the retirement asset portfolio after a projected number of years can vary depending on which asset classes and/or which money classes are used to fund a cash flow target value. As such, in various embodiments, statistical sampling methods such as orthogonal sampling can be used to produce a distribution schedule which maximizes the end of time retirement asset portfolio value.

FIG. 4B illustrates a distribution schedule 477 in accordance with an embodiment of the present disclosure. In the embodiment illustrated in FIG. 4B, the various money sources available to the retired individual are divided as described in FIG. 4A. As such, the money sources are divided into six different money classes based, at least partially, on disparate tax treatment.

In various embodiments, and as shown in FIG. 4B, the distribution schedule 477 indicates particular sums, e.g., 458-1, 458-2, 458-3, 458-4, 458-5, and 455-6, for the individual to withdraw from particular money sources within particular money classes, e.g., accounts C2, Q1, R1, NQ2, DA1, and MB1 within money classes Cash, Qualified, Roth, Non-Qualified, Non-Qualified Deferred Annuities, and Municipal Bonds, respectively, in order to maximize the individual's long-term wealth and in order to fund the monthly cash flow deficit, e.g., 438 ($1,483), for a current retirement year.

The distribution schedule can be determined using a distribution tool such as distribution tool 475 shown in FIG. 4A and can incorporate data from subsystems 300 and 301 described in connection with FIGS. 3A and 3B, respectively.

FIG. 5 illustrates an asset allocation tool 500 that can be used for distributing retirement assets in accordance with embodiments of the present disclosure. In various embodiments, the asset allocation tool 500 can be operated in conjunction with an asset distribution tool, e.g., distribution tool 475 shown in FIG. 4A, in order to provide efficient distribution of retirement assets.

In various embodiments, the allocation tool, e.g., tool 500, ranks a number of asset classes in an order in which the classes can be used to fund qualified versus non-qualified accounts in a tax-efficient manner for a particular individual. The embodiment illustrated in FIG. 5, includes data for a particular individual. The data includes a qualified balance 571, e.g., a fund amount allocated to qualified accounts such as IRAs and 401(k) accounts, and a non-qualified balance 573, e.g., a fund amount allocated to non-qualified accounts.

The allocation tool 500 can be used to project future values of the various asset classes 570 after a particular number of years 574, e.g., 20 years in this case, based on factors such as a particular income tax rate 575 for the individual and a capital gains tax rate 576. As one of ordinary skill in the art will appreciate, the future values of an asset class depends on whether the asset class is used to fund a qualified or non-qualified account.

As illustrated in FIG. 5, the allocation tool 500 can calculate a qualified future value 596 and a non-qualified future value 597 for each asset class 570. Calculation of the future values 596 and 597 includes a qualified return rate 580, an interest rate 582, a dividend rate 584, a capital gains rate 586, a turnover rate 586, a realized gains rate 590, a deferred growth rate 592, and a non-qualified return rate 594. In various embodiments, the asset allocation tool 500 can be configured to incorporate tax basis data associated with the number of different asset classes 570 into the calculation of the number of different projected future values, e.g., 596 and/or 597.

In the embodiment illustrated in FIG. 5, the allocation tool 500 provides a rank value 598 calculated as the difference between the qualified future value 596 and the non-qualified future value 598. In this embodiment, each asset class receives a numerical ranking 599 and a list 572 depicting asset classes 570 along with their ranking 599 in numerical order. In this embodiment, the ranking 599 corresponds to a recommended order in which the asset classes 570 can be used to fund qualified and non-qualified accounts in a tax-efficient manner.

In this embodiment, the rankings 599 provided by the allocation tool 500 indicate, based on priority, an order in which the asset classes should be used to fund qualified accounts. That is, in this example, the high yield bond asset class (ranking 1), followed by the intermediate bond asset class (ranking 2), etc., should be used to fund qualified accounts until (up to a maximum allowable value)

Figure 6:
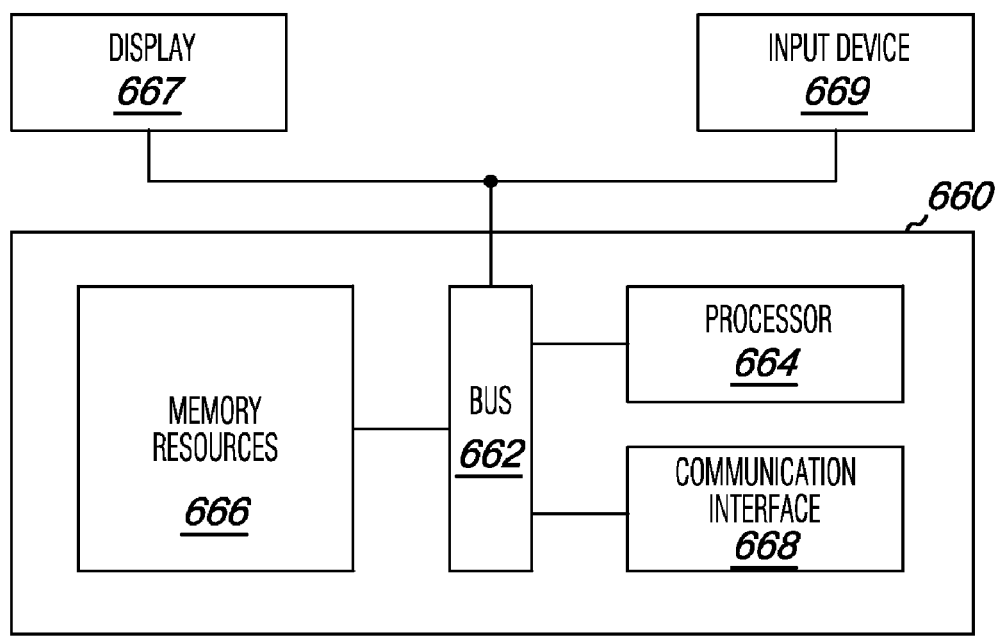
FIG. 6 illustrates a computing device for distributing retirement assets according to embodiments of the present disclosure.

FIG. 6 illustrates a computing device 660 for distributing retirement assets according to embodiments of the present disclosure. The computing device 660 can be a desktop, laptop, or handheld computing device, among other types of computing devices. In one or more embodiments, the computing device 660 can be a computing device such as computing device 205 described in connection with FIG. 2

In the embodiment illustrated in FIG. 6, the computing device 660 includes memory resources 666 coupled to a processor 664 via a bus 662. The memory resource 666 can include random access memory (RAM), read only memory (ROM), and/or other storage media capable of storing computer executable instructions, e.g., program instructions, that can be executed by the processor 664 to perform various embodiments of the present disclosure. In various embodiments, the memory resources 666 can store computer executable instructions corresponding to a retirement asset distribution tool and/or a retirement asset allocation tool, e.g., distribution tool 217 and/or allocation tool 215 shown in FIG. 2.

As used herein, the term "computer executable instructions" refers to instructions that may be performed by a processor, e.g., processor 664, and/or other components. The term "storage media" can includes various storage media that can be used to store computer executable instructions. Storage media can include non-volatile media and/or volatile media, among other types of media and can be in the form of magnetic media, optical media, and/or physical media, among others. Some examples include hard disks, floppy disks, CD ROMs, DVDs, and Flash memory. Embodiments of the present disclosure are not limited to a particular type of storage media.

In the embodiment illustrated in FIG. 6, the computing device 660 is coupled to a display 667. The display 667 can be a liquid crystal display (LCD) monitor or a cathode ray tube (CRT), among various other display types capable of displaying information to a user.

In the embodiment illustrated in FIG. 6, the computing device 660 is coupled to one or more input devices 669. The input device 669 can include a keyboard, voice activated system, touch screen system, and/or mouse, among various other input devices.

In the embodiment illustrated in FIG. 6, the computing device 660 includes a communication interface 668. The interface 668 can provide data communication coupling between the computing device 660 and a network. e.g., network 225 shown in FIG. 2, other computing devices, e.g., client and/or server devices, storage media, and the like. As an example, the communication interface 668 can be an integrated services digital network (ISDN) card or a modem used to provide a data communication connection to a corresponding type of telephone line. The communication interface 668 can also be a LAN card used to provide a data communication connection to a compatible LAN. The interface 668 can also be a wireless link used to send and receive various types of information.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for distributing retirement assets, comprising:
a subsystem configured to:
receive personal data related to an individual, the personal data including a number of projected income sources and a value of projected expenses of the individual;
receive retirement asset allocation data of the individual, the retirement asset allocation data including current fund allotments to a number of money classes each having disparate tax treatment; and
a computing device configured to:
calculate a value of projected after-tax income of the individual;
calculate a deficit amount when the value of projected expenses exceeds the value of projected after-tax income; and
use orthogonal sampling to calculate a distribution schedule for funding the deficit amount, the distribution schedule including, for each of the number of money classes, a recommended sum for the individual to withdraw from the money class in order to fund the deficit amount.

2. The system of claim 1, the computing device configured to determine the recommended sum for the individual to withdraw from each of the number of money classes while maximizing a projected after-tax end of time value of the number of money classes over a particular time horizon.

3. The system of claim 2, the computing device configured to calculate the distribution schedule such that the distribution schedule provides, for each of the number of money classes, the recommended sum for the individual to withdraw on a monthly basis for funding the deficit amount over the particular time horizon.

4. The system of claim 1, including a withdrawal subsystem configured to, for each of the number of money classes, automatically withdraw the recommended sum from an account associated with the money class on the individual's behalf, based on the distribution schedule.

5. The system of claim 1, the received retirement asset allocation data of the individual including, for one or more of the number of money classes, current fund allotments to a number of different asset classes used to fund an account corresponding to the one or more of the number of money classes.

6. The system of claim 5, the computing device configured to use orthogonal sampling to project future growth on the current fund allotments to the number of different asset classes in order to calculate the distribution schedule.

7. The system of claim 1, the computing device configured to adjust the distribution schedule based on one or more adjustments made to the received personal data related to the individual.

8. A method for distributing retirement assets, comprising:
receiving personal data related to an individual, the personal data including a number of projected income sources and a value of projected expenses of the individual;
receiving retirement asset allocation data of the individual, the retirement asset allocation data including current fund allotments to a number of money classes each having disparate tax treatment;
calculating a value of projected after-tax income of the individual;
calculating a deficit amount when the value of projected expenses exceeds the value of projected after-tax income; and
using orthogonal sampling to calculate a distribution schedule for funding the deficit amount, the distribution schedule including, for each of the number of money classes, a recommended sum for the individual to withdraw from the money class in order to fund the deficit amount.

9. The method of claim 8, including determining the recommended sum for the individual to withdraw from each of the number of money classes while maximizing a projected after-tax end of time value of the number of money classes over a particular time horizon.

10. The method of claim 9, including calculating the distribution schedule such that the distribution schedule provides, for each of the number of money classes, the recommended sum for the individual to withdraw on a monthly basis for funding the deficit amount over the particular time horizon.

11. The method of claim 8, including, for each of the number of money classes, automatically withdrawing the recommended sum from an account associated with the money class on the individual's behalf, based on the distribution schedule.

12. The method of claim 8, wherein receiving retirement asset allocation data of the individual includes receiving asset allocation data including, for one or more of the number of money classes, current fund allotments to a number of different asset classes used to fund an account corresponding to the one or more of the number of money classes.

13. The method of claim 12, including using orthogonal sampling to project future growth on the current fund allotments to the number of different asset classes in order to calculate the distribution schedule.

14. The method of claim 8, wherein the method includes adjusting the distribution schedule based on one or more adjustments made to the received personal data related to the individual.

15. A computer readable medium having instructions stored thereon that can be executed by a computing device to:
receive personal data related to an individual, the personal data including a number of projected income sources and a value of projected expenses of the individual;
receive retirement asset allocation data of the individual, the retirement asset allocation data including current fund allotments to a number of money classes each having disparate tax treatment;
calculate a value of projected after-tax income of the individual;
calculate a deficit amount when the value of projected expenses exceeds the value of projected after-tax income; and
use orthogonal sampling to calculate a distribution schedule for funding the deficit amount, the distribution schedule including, for each of the number of money classes, a recommended sum for the individual to withdraw from the money class in order to fund the deficit amount.

16. The computer readable medium of claim 15, including instructions executed to determine the recommended sum for the individual to withdraw from each of the number of money classes while maximizing a projected after-tax end of time value of the number of money classes over a particular time horizon.

17. The computer readable medium of claim 16, including instructions executed to calculate the distribution schedule such that the distribution schedule provides, for each of the number of money classes, the recommended sum for the individual to withdraw on a monthly basis for funding the deficit amount over the particular time horizon.

18. The computer readable medium of claim 15, including instructions executed to, for each of the number of money classes, automatically withdraw the recommended sum from an account associated with the money class on the individual's behalf, based on the distribution schedule.

19. The computer readable medium of claim 15, including instructions executed to receive retirement asset allocation data of the individual that includes, for one or more of the number of money classes, current fund allotments to a number of different asset classes used to fund an account corresponding to the one or more of the number of money classes.

20. The computer readable medium of claim 19, including instructions executed to use orthogonal sampling to project future growth on the current fund allotments to the number of different asset classes in order to calculate the distribution schedule.

21. The computer readable medium of claim 15, including instructions executed to adjust the distribution schedule based on one or more adjustments made to the received personal data related to the individual.

* * * * *